United States Patent [19]
Fourment et al.

[11] 3,784,396
[45] Jan. 8, 1974

[54] A PROCESS FOR TREATING A SUBSTRATE WITH ETHYLENE-MALEIC ANHYDRIDE COPOLYMER POWDER

[75] Inventors: Marie-Claude Gloriod Nee Fourment, Bully-Les-Mines; Adrien Nicco, Bethune, both of France

[73] Assignee: Ethylene Plastique, Courbevoie, France

[22] Filed: Mar. 24, 1972

[21] Appl. No.: 237,915

[30] Foreign Application Priority Data
   Mar. 25, 1971  Great Britain..................... 7853/71

[52] U.S. Cl.................. 117/21, 117/27, 117/104 R, 117/105.1, 117/105.2, 117/123 D, 117/132 C, 117/140 A, 117/155 R, 117/161 UC, 117/124 E, 117/126 GB, 117/141, 260/546
[51] Int. Cl........................... B44d 1/02, B44d 1/44
[58] Field of Search................. 117/21, 27, 161 UC, 117/104 R, 105.1, 105.2, 123 D, 132 C, 140 A, 155 R; 260/546

[56] References Cited
UNITED STATES PATENTS

| | | | |
|---|---|---|---|
| 3,211,808 | 10/1965 | Young et al.................. | 117/161 UC |
| 3,415,673 | 12/1968 | Clock................................... | 117/21 |
| 3,647,520 | 3/1972 | Gor................................ | 117/161 UC |
| 3,449,145 | 6/1969 | Bloom et al......................... | 117/21 |
| 3,671,295 | 6/1972 | Ravve et al..................... | 117/161 UC |

*Primary Examiner*—William D. Martin
*Assistant Examiner*—William R. Trenor
*Attorney*—Bacon & Thomas et al.

[57] ABSTRACT

A process for treating the surface of a material is provided which comprises treating the surface with a powder of a statistical copolymer of ethylene and maleic anhydride having a particle size of between $0.5\mu$ and $400\mu$ and possessing, in the dispersed state, on its particles, at least one crosslinking agent for the copolymer, which contains as reactive groups one, two, three or four alcoholic-OH groups and at least one amino or amido group, in an amount from 0.05 to 6 reactive groups per anhydride group present in the copolymer, and then bringing the powder to a temperature of between 110° and 300°C.

11 Claims, No Drawings

A PROCESS FOR TREATING A SUBSTRATE WITH ETHYLENE-MALEIC ANHYDRIDE COPOLYMER POWDER

The present invention relates to a powder based on an ethylene maleic anhydride copolymer for the treatment of the surface of a material.

This invention relates to a process for the treatment of the surface of a material which comprises treating the surface with a powder of a statistical copolymer of ethylene and maleic anhydride, having a particle size of between $0.5\mu$ and $400\mu$ and possessing on the surface of its particles, at least one crosslinking agent for the copolymer which contains as reactive groups, one, two, three or four alcohol (OH) groups and at least one amino or amido group, in an amount from 0.05 to 6 reactive groups per anhydride group present in the copolymer and then bringing the powder to a temperature of between 110° and 300°C.

The copolymers which can be used in the process of this invention are known and include the binary statistical copolymers obtained in a conventional manner by radical copolymerisation of ethylene and maleic anhydride under high pressure in a stirred autoclave reactor. It is also possible to use, instead of the ethylene/maleic anhydride, terpolymers which contain, in addition to ethylene-derived units and maleic anhydride-derived units, a small amount of a third monomer, copolymerisable, by a free radical process, with the other two. Suitable third monomers include for example, olefines, vinyl derivatives and acrylic derivatives such as propene, isobutene, vinyl acetate, ethyl acrylate or methyl vinyl ether.

The most convenient copolymers are the copolymers of ethylene and maleic anhydride (EMA) which contain from 80 to 99 parts by weight of units originating from ethylene and from 1 to 20 parts by weight of units originating from maleic anhydride; the grades (melt index) of such copolymers generally varies between approximately 0.5 and 3,000.

The copolymers must be used in the form of powders having an average particle size of between 0.5 and 400 $\mu$. Such powders can be prepared by any known method, and, of course, the most suitable method will be used. A convenient way of preparing these powders consists of producing them via an aqueous emulsion of the copolymer. Alternatively, the copolymer may be ground in known apparatus such as can be used for grinding polyethylene.

Thereafter, a good dispersion of the selected crosslinking agent on the powder must be achieved. Such a dispersion can be effected by any known means, for example by introducing the powder into a suitable aqueous medium to produce a suspension, and by adding the crosslinking agent to the suspension. In such a case, the suspension can be used directly for coating the material.

The crosslinking agent which is used must contain one, two, three or four alcoholic —OH groups and at least one amine or amide group. It can however contain other chemical groups which are unreactive or at most slightly reactive towards the reactive groups of the copolymer.

Suitable crosslinking agents include the following: monoethanolamine, diethanolamine, methanolamine, 1-amino-2-propanol, 3-amino-1-propanol, tripropanol-2-amine, 2-amino-2-methyl-1,3-propanediol, 2-ethyl-2-amino-1,3-propanediol, methyldiethanolamine, phenyldiethanolamine, diethylamino-ethanol, 2-amino-1-butanol, dipropanol-2-amine, alkylpoly-ethanolamines of formula:

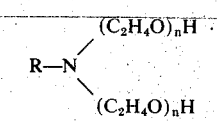

where $2n$ is between 2 and 15, and the R radical contains one to 20 carbon atoms, such as "Noramox" $S_2$ and $S_{11}$ obtainable from Messrs. Prochinor; polyoxyethylenated derivatives of alkylaminotrimethyleneamines of formula;

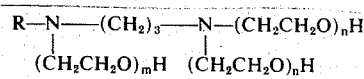

where R is a radical containing from one to 18 carbon atoms, and $m + 2n$ is between 1 and 20 and hydroxyethyldiethylenetriamine. Crosslinking agents containing at least two alcohol groups and at least one amido group which may be used include the alkylpolyethanolamides of formula:

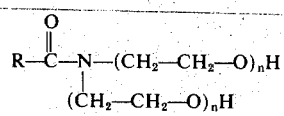

where R is a radical containing between one and 20 carbon atoms and $n$ is between 1 and 15.

The choice of crosslinking agent will, of course, depend on the intended end use; thus, for example, the choice of the crosslinking agent depends on the particle size of the copolymer powder and on its rate of diffusion into the copolymer particles, taking into account the size of the particles, the conditions under which the heating of the coating on the substrate is carried out, and the material of the substrate on which the powder is to be used. It has been found that the reagents which can be used according to the invention do not penetrate into the copolymer particles before heating and fusion. In contrast, a polyamine which does not possess an alcohol group diffuses very rapidly and, through premature reaction, leads to the formation of films which are non-adherent, though partly crosslinked.

Hydroxyethyldiethylenetriamine, which diffuses quite easily, is particularly suitable for powders of particle size between 70 and $400\mu$. Monoethanolamines, diethanolamines and triethanolamines are preferred for powders of particle size between 0.5 to $100\mu$. The chemical reactions which take place are carried out by heating the combination of substrate or material and the powder layer to a temperature of between 110° and 300°C., preferably of 150 to 280°C., for a period which is generally between 10 seconds and 1 hour. The precise temperature and time employed depends on the desired end use and on the products in question. The heating can be carried out in various ways. For example, it is possible to heat the material (or substrate) and to spray the treated copolymer powder onto its hot surface, or to heat the combination of material and treated powder after the latter has been applied. It is sometimes possible to subject the combination of material and treated powder, after heating according to the invention, to an appropriate post-heating, preferably localised, so as to level the surfaces obtained. It is also possible, according to the invention, to use, instead of ethylene/maleic anhydride copolymers, terpolymers which contain, as well as ethylene-derived units and between 0.5 and 20 percent of maleic anhydride-derived units, a small amount of a third monomer copolymerised, by a free radical process, with the other two. Such third monomers include, for example, olefines, vinyl derivatives and acrylic derivatives.

The process of the present invention has many useful applications, many of which are illustrated in the Examples which follow.

In the following Examples which further illustrate the present invention, the adhesion was measured by a 180° peeling test in accordance with Standard Specification ASTM D 903-49. A sheet of glass 105 mm long, 25 mm wide and 4 mm thick was bonded to a 200 $\mu$ aluminium foil with a polymer powder layer of 100 to 200 $\mu$ thickness, taking care to introduce a "mylar" tab between the glass and the polymer so as to provide something on which to pull.

The powder was obtained directly from a dry mix, or after drying the modified dispersion. The coated aluminium strip can easily be lifted off and folded over to allow part of the uncovered polymer to be introduced into the jaws of a tensometer (Lhomargy, pulling speed 100 mm/minute).

The combination was thereafter pressed in a press (pressure 3 kg/cm$^2$, temperature 165° or 200°C., stoving time 10 minutes unless otherwise indicated).

Identical sandwiches of aluminium (length 105 mm, width 25 mm, thickness 2 mm), polymer (100 to 200 $\mu$), and copper or aluminium foil of 200 $\mu$ thickness were produced for measuring the adhesion to aluminium, copper and steel and other materials.

EXAMPLE 1 (Comparative)

An aqueous dispersion, 50/50 by weight, of a powder, of average particle size 1.5 $\mu$, of a copolymer of grade 7.2, containing 2.62 percent of maleic anhydride, is prepared. The viscosity is adjusted by introducing 0.2 percent of hydroxyethylcellulose. A 150 $\mu$ thick film is deposited on a sheet of glass, on aluminium and on copper by means of a calibrated-face filmograph, and the sample is subjected to a temperature of 200°C for 4 minutes. A very poor bond to the support is obtained, measured to be 0.19 kg/cm on sodium-calcium glass, 0.56 on Pyrex borosilicate glass, 0.51 on aluminium, 0.26 on copper, 0.73 on steel, 0.26 on Cellophane and 1.70 on Nylon, using the peeling test described above.

EXAMPLE 2

Example 1 is repeated, but the dispersed medium is modified by introducing 0.1, 0.25 and 0.5 mol of diethanolamine reagent per mol of maleic anhydride in the copolymer. After stoving the sample at 165°C and 200°C, the bond strength to the substrate becomes remarkable.

At a content of 0.5 mol of diethanolamine, the adhesions obtained after stoving at 200°C are 4 kg on sodium-calcium glass, 3.4 on Pyrex glass, 0.70 kg/cm on aluminium, 0.376 kg/cm on copper, 2.70 on steel, 0.8 on Cellophane and 4 on Nylon. Against this, at a content of 0.1 mol of reagent, 1.70 kg/cm is obtained on glass, 2 on aluminium and 0.47 on copper.

Infra-red determinations carried out on the film obtained at 200°C, using a content of 0.5 mol of reagent, indicate that 50 percent of the anhydride groups have been converted into ester-acid and amide groups. The grade of the resin can no longer be measured (less than 0.01) and extraction with boiling xylene yields 58 percent of insoluble matter.

Similar results were obtained under the same conditions with each of the following reagents: triethanolamine, monoethanolamine, dipropanol-2-amine, diethylamino-ethanol, tripropanol-2-amine, 3-amino-1-propanol, 2-ethyl-2-amino-1,3-propanediol and 2-amino-2-methyl-1,3-propanediol.

EXAMPLE 3

Example 1 is repeated, but 0.5 mol of phenyldiethanolamine is added to the polymer dispersion. In the peel test, the film of polymer on glass tears at a force above 3 kg/cm; the adhesion is 1.68 kg/cm on aluminium and 0.54 kg/cm on copper.

The adhesion on copper is improved by using substituted diethanolamine derivatives. Comparable results are obtained with methyldiethanolamine, stearyldiethanolamine, and stearylamine condensed with 12 mols of ethylene oxide.

EXAMPLE 4

Example 1 is repeated, but the dispersed medium is modified with 0.5 mol of N,N'-dihydroxyethyldiethylenetriamine per mol of anhydride in the copolymer. After stoving the sample at 200°C, the peel strength is 0.8 kg/cm on aluminium and 0.7 kg/cm on copper.

EXAMPLE 5

A powder of particle size 2 $\mu$ of a copolymer of grade 9.4 and of maleic anhydride content 4.5 percent is modified with 0.5 mol of oleyl-pentaethanolamide per mol of maleic anhydride in the copolymer. After stoving the sample at 200°C, the bond strength increases from 0.528 kg/cm to 2.6 kg/cm on glass, from 0.5 kg/cm to 2.8 kg/cm on aluminium and from 0.45 kg/cm to 0.50 kg/cm on copper.

Similar results are obtained with the polyethanolamides of the formula:

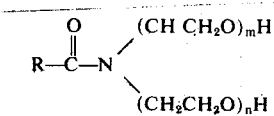

in which $m + n$ is between 2 and 30 and R is a carbon chain containing from one to 20 carbon atoms.

The invention can be employed for various and important industrial applications, some of which are illustrated below:

A. Metal Coating

The process according to the invention makes it possible to produce metal coatings which adhere very strongly, and also makes it possible to glue metals of the same nature or of different nature to one another. Thus, due to the remarkable adhesion achieved by employing the process according to the invention, it is generally no longer necessary for the metal surface to be specially treated (degreasing and mechanical or chemical roughening) nor to use a "primer" which provides the bond between the metal and the co-polymer.

Of course, the use of the said "primer" or the treatment of the surfaces remains a possibility.

The properties of the coating (or of the glue line if the process is used for gluing purposes) are those of a cross-linked or bridged polymer. Hence they display certain advantages relative to the properties of the layers of thermoplastic polymers currently used.

From a practical point of view, the uses of the process according to the invention with metals allow applications in the following fields: insulating coatings (electrical or thermal), anti-corrosive coatings, metal/polymer/metal sandwiches which can be used in the automobile industry, and sound insulation. Examples 6 to 9 illustrate some applications in this field.

EXAMPLE 6

An ethylene-maleic anhydride (EMA) copolymer of grade 9.4 and of maleic anhydride content 4.5 percent is mechanically ground so as to yield particles of size varying between 70 and 400 μ. 0.25 Mol of aqueous diethanolamine per mol of maleic anhydride in the copolymer is intimately mixed with the powder obtained.

After 10 minutes' stoving at 200°C in accordance with the test described above, the peel strength is 1.8 kg/cm on aluminium and 0.8 kg/cm on copper.

This modified powder has been applied in accordance with the so-called flame-spraying method. The powder, propelled by a jet of air in the flame of a blow torch, melts and crosslinks in contact with the preheated substrate (temperatures of between 150° and 280°C). At 150°C, at which temperature peelable coatings are obtained with the usual resins, very strong, permanent bonds are obtained with the composition described. This technique has allowed a 5 mm thick lining to be produced by coating and stoving at 150°C.

EXAMPLE 7

A dry powder of particle size between 50 and 350 μ of a copolymer of 4 percent maleic anhydride content and of grade 20, modified with 0.5 mol of triethanolamine per mol of maleic anhydride in the copolymer, allowed adherent coatings of 0.2 mm to 1.5 mm to be produced by fluidised bed deposition on metal objects of irregular shape. Preheating the substrate to 260°C for 6 minutes, followed by steeping it for 6 seconds in a bath of a powder of average particle size 150 μ (bed temperature 24°C, speed of air blown in 1.6 m/minute) yielded a very adherent coating of 200 μ after postheating at 240°C for a few seconds.

EXAMPLE 8

Powders modified with 0.5 mol of dihydroxyethyldiethylenetriamine per mol of meleic anhydride in the co-polymer (particle size between 0.5 μ and 50 μ) of grade 10 and maleic anhydride content 2.8 percent were employed successfully by electrostatic spraying and by means of a fluidised electrostatic bath. After preheating the metal to 220°C, adherent coatings of excellent quality and of thickness between 0.12 and 0.5 mm were produced. With these fine powders, it was possible to prepare stable, aqueous dispersions and to coat metal foil (thickness 40 to 80 μ) in accordance with the technology of liquids. Using knife coating, an aqueous dispersion containing 40 percent of polymer (Brookfield LVF viscosity at 6 revolutions/minute, 600 cPs) makes it possible to obtain coatings of thickness between 0.025 and 0.5 mm at a rate of 300 m/minute. After evaporating the solvent and passing through an oven at between 120° and 240° metal temperature, a strongly adherent coating is obtained within the space of a few seconds.

EXAMPLE 9

Similar results as those in Example 8 were obtained on treating the metal substrate with a solution of a crosslinking agent before depositing the copolymer powder.

Thus, a 50/50 solution of diethanolamine in methanol is sprayed onto an aluminium foil. After evaporating the methanol, a 2 μ powder of an ethylene-maleic anhydride copolymer of grade 9.4 and of maleic anhydride content 4.5 percent is sprayed onto the substrate. After stoving at 200°C, the bond is 3 kg/cm instead of 0.5 kg/cm on an untreated metal. Under the same conditions, a similar powder of polyethylene in place of the copolymer forms a very weakly bonded layer (less than 0.5 kg/cm) after stoving.

B. Coatings on Glass

The exceptional adhesion of the coatings according to the invention to glass makes it possible to use the process to produce glasses coated with a very thin layer of copolymer, to produce lightweight glasses in which the copolymer appears as a reinforcing element, to manufacture various laminates in which glass plays a part, and to size glass fibres. Examples 10 to 14 illustrate some applications in this field.

EXAMPLE 10

On customary sodium-calcium glasses, the peel strength of the coatings according to the process is 4 kg/cm after stoving at 165°C.

A 40 percent strength aqueous dispersion of a copolymer (EMA) of grade 9 and of maleic anhydride content 4.6 percent (particle size 2 μ), containing 0.25 mol of diethanolamine per mol of maleic anhydride in the copolymer, was sprayed onto a glass container. After stoving, an adherent cross-linked coating of thickness varying between 20 μ and 200 μ, which is very strong, is obtained. The impact strength of the glass increases by more than 70 percent, and the resistance to internal pressure by more than 50 percent.

The plastic coating forms a protective layer against abrasion which can occur during handling, holds together the fragments of glass produced on breaking a bottle, deadens blows (?), and resists the increase in temperature and the chemical attack which occur during pasteurisation. The copolymers of grades less than 100 and particle size less than 50 μ are used preferentially.

EXAMPLE 11

A glass-polymer-glass laminate was produced by combining two sheets of glass of thickness 2 mm with a bonding layer consisting of two 50/50 dispersions of a copolymer (EMA) (reference product) and a 50/50 dispersion (EMA) modified with diethanolamine. A 100 μ coating was produced on each sheet of glass by means of the filmograph with a 200 μ calibrated face, the water was evaporated at 100°C, and the coated faces were brought into contact and heated in a press at 165°C for 4 minutes under slight pressure (3 kg). The sandwich obtained with the modified dispersion is very resistant to immersion in water. In the absence of a crosslinking agent, the layers come apart immediately.

EXAMPLE 12

The dispersion quoted in Example 10 allowed a net of glass fibres to be bonded very efficiently.

It is also used to coat glass fabrics which can, for example, be used in the wall covering and upholstery industry, in order to produce combinations such as paper-polymer-glass fabric.

EXAMPLE 13

An aqueous dispersion of an ethylene-maleic anhydride copolymer of grade 2900, of 10 percent maleic anhydride content, containing 17 percent of solid particles (particle size less than 1 $\mu$), and modified by introducing 0.25 mol of diethanolamine per mol of maleic anhydride in the copolymer, was prepared.

The dispersion, diluted to 1.5 percent, is applied to glass so that, after stoving, a thin protective coating of less than one micron thickness is produced. The partially crosslinked and strongly adhering film protects the skin of the glass more effectively against all causes of external damage than do the usual coatings (poly-(ethylene oxide) waxes or polyoxyethylene stearate), and the strength of the glass is thereby greatly increased.

To estimate the slip property of the coating, the coefficient of friction of the treated glass is measured by the inclined plane method.

Sliding friction is reduced by half relative to the untreated glass. The introduction of diethanolamine into the dispersion hence results in a reduction of the coefficient of friction, similar to that of the usual coatings.

Ethylene-maleic anhydride copolymers of molecular weight between 1,500 and 10,000 and of maleic anhydride contents greater than 1.6 percent are more particularly suitable for this use.

EXAMPLE 14

The dispersion containing 17 percent of solid particles, described in Example 13, diluted to 5 percent, is used as a sizing bath for glass fibres. After evaporating the water and stoving at 165°C, the coating represents about 0.5 to 2 percent by weight of the glass. The glass fibres thus treated for example reinforce the mechanical properties of polyethylene similarly to the reinforcement obtained with fibres sized with the mixture of polyvinyl acetate, fatty amide and vinyltriethoxysilane (conventional sizing), even after storage in a moist atmosphere.

C. Textile Coatings

The process according to the invention can be used widely in the textile industry. Thus the modified ethylenemaleic anhydride copolymer powders:

a. can be used, in the form of powders of particle size generally less than 400 $\mu$, to coat fabrics and carpets. The cross-linked polymer layer serves as a reinforcing support (tablecloths, sails or carpets), and as a finishing agent in the production of collars and cuffs. In laminating, the polymer serves as an intermediate layer between a fabric and a sheet of foam or of jute, and for gluing two different fabrics together (for example for gluing the lining onto the fabric);

b. can be used, in the form of fine powders of size less than 50 $\mu$ — either dry or wet — in the applications quoted above. The powders furthermore form an excellent binder in non-woven fabrics of wool viscose-cotton-staple rayon-chlorinated acrylic fibre-polyamide; or c. are used, in the form of ultrafine powders of size less than one micron, either as a finish or combined with finishing resins (creaseproofing resins) to modify the effects they produce, or in the after-treatment of fabrics already treated.

Used as a finish, they generally increase the tear strength and abrasion resistance, and give the fabric a softer handle, a more flexible drape and a glossy and uniform appearance. Compared to polyethylene emulsions, the crosslinkable EMA dispersions have the advantage of being resistant to repeated washings and drycleanings (as a consequence of the crosslinking and of the bond to the fibre).

Combined with the measures usually employed to increase the crease resistance of fabrics, they improve the mechanical properties of the fabrics which have been greatly reduced by the treatment with resins alone.

In an after-treatment, they possess the property of reducing the felting and shrinkage of wool and of cotton. Crosslinking after fixing to the textile fibre is absolutely essential for obtaining the desired property. The crosslinkable EMA dispersions which are capable of becoming chemically fixed to the fibre and of crosslinking on contact with it, prove more effective than the known finishes.

The following Examples 15 to 17 illustrate these applications in this field.

EXAMPLE 15

A 50 percent strength aqueous dispersion of a powder of particle size 2 $\mu$ of an ethylene-maleic anhydride copolymer of grade 9.4 and maleic anhydride content 4.5 percent is prepared. The Brookfield viscosity at 6 rpm is increased to 465 cPs by introducing 0.4 percent of hydroxyethylcellulose HG 15,000 cPs.

A drop of 0.003 cm³ of this dispersion is deposited by means of a micro-syringe onto two parallel single fibres of regenerated cellulose spaced 0.5 mm apart ("viscose" of 15 denier and of 80 mm length). After drying the drop, the sample is subjected to a heat treatment at 135°C for 3 minutes so as to produce a point-bond between the two fibres.

Each of the fibres on either side of the point of attachment is cut flush therewith and the composite fibre is stretched in a tensometer so as to study the fibre-binder behaviour during stretching (Instron, pulling speed 0.2 cm/minute). This method allows the effectiveness of this dispersion as a binder in a viscose non-woven fabric to be assessed. The fibre slips in the binder under a load of 24 ± 1.5 g; the elongation is 14 to 20 percent; an initially single fibre has a tensile strength of 25.4 ± 1.5 for an elongation of 18.6 percent.

The unmodified EMA copolymer dispersion thus does not restore the tensile strength of a fibre.

By way of comparison, the fibres were "glued" by means of a commercial product sold for this purpose, this being a resin of the acrylic ester latex type. The tensile strength was found to be 21 ± 1.5 g. With polyethylene of low density, 18 ± 1.8 g was found as a result of slipping.

EXAMPLE 16

Example 15 is repeated, but the dispersion is modified with 0.25 mol of diethanolamine per mol of maleic anhydride in the copolymer (Brookfield LVF viscosity at 6 rpm = 545 cPs).

The fibre breaks at loads of 26.6 ± 1.5 g.

The binder hence restores the initial strength of the fibre.

Similar results were obtained with the following single fibres: polyamide (Nylon 66 of 15 denier and 70 mm length), acrylic (of 15 denier and 100 mm length), polypropylene (of 15 denier and 90 mm length), wool and cotton.

The crosslinkable EMA dispersions were used to strengthen non-woven nets manufactured by the dry method and by the wet method, and the good properties are largely retained after treatment with a grease-removing solvent.

EXAMPLE 17

After crosslinking, the ethylene-maleic anhydride copolymer dispersions constitute excellent non-felting and non-shrinking finishes for wool.

An aqueous dispersion containing 10 percent of a 1.5 $\mu$ powder of a copolymer of grade 480, containing 8.1 percent of maleic anhydride, modified with 0.5 mol of diethanolamine per mol of maleic anhydride in the copolymer, is prepared.

A double thickness knitted woollen fabric of size 30 × 40 cm (2 × 36 dtex yarns) is immersed in this dispersion for 3 minutes and drained so as only to retain 5 percent of resin.

After stoving at 160°C for 3 minutes in a horizontal oven, the surface shrinkage of the sample is measured as a function of the number of CUBEX washes, in accordance with the IWS standard specification. After seven washes in the Cubex, the shrinkage is only 5 percent, whilst the untreated jersey shrinks by 65 percent.

Furthermore, the mechanical properties are improved even after treatment with grease-removing solvents.

The chemical bond between the polypeptide chains and the copolymer, and the crosslinking on contact with the fibre explains the performances of the finish.

Copolymers of grade above 100 with various contents of maleic anhydride are more particularly suitable.

D. Paper

The process according to the invention is also of value for increasing the tensile strength and tear strength of papers and cardboards, preferably through addition to the aqueous dispersion of paper pulp.

E. Agglomerates

It is also possible to use the process according to the invention to effect the agglomeration of various particles, such as, for example, vegetable scrap (wood, shavings, hemp or straw) or of various fibres (cotton, rayon, Nylon or leather).

We claim:

1. In a process for the treatment of the surface of a substrate wherein the surface is treated with a powder of a statistical copolymer containing from 80 to 99 parts by weight of units derived from ethylene and from 1 to 20 parts by weight of units derived from maleic anhydride and the powder is brought to a temperature between 110° to 300°C to form an adhesive coating, the improvement which comprises treating the surface of the substrate with a powder of the copolymer having a particle size of between 0.5$\mu$ and 400$\mu$ and possessing, in a dispersed state on the surface of the particles, at least one cross-linking agent for the copolymer containing as reactive groups one, two, three or four alcoholic —OH groups and at least one amino or amido group, in an amount from 0.05 to 6 reactive groups per anhydride group present in the copolymer.

2. The process according to claim 1 in which the copolymer contains, in addition to units derived from ethylene and maleic anhydride, less than 10 percent by weight of at least one unit derived from an α-olefine or vinyl or acrylic derivative which can be copolymerised with ethylene and maleic anhydride.

3. The process according to claim 1, in which the powder is an aqueous suspension of copolymer containing the crosslinking agent.

4. The process according to claim 1 in which the powder is brought to the temperature of between 110° and 300°C by heating the substrate coated with powder.

5. The process according to claim 1 in which the substrate is a metal, glass, textile or paper.

6. The process according to claim 1 in which the substrate is in the form of elementary particles which are thereafter agglomerated by the cross-linked polymer.

7. The process according to claim 1 in which the cross-linking agent is diethanolamine, phenyldiethanolamine, triethanolamine or an alkylpolyethanolamide of formula:

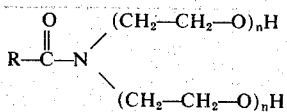

where R is a radical containing between one and 20 carbon atoms and $n$ is between 1 and 15.

8. The process according to claim 1 in which the powder is brought to the temperature of between 110° and 300°C by pre-heating the substrate and depositing the mixture of copolymer and crosslinking agent on the pre-heated substrate.

9. The process according to claim 8 in which the mixture is deposited on the pre-heated substrate by spraying.

10. The process according to claim 1 in which the powder is brought to the temperature of between 110° and 300°C by heating the powder and subsequently coating the substrate with the hot powder.

11. The process according to claim 10 in which the coating is produced by the flame-spraying process.

* * * * *